United States Patent [19]
Ozeki

[11] Patent Number: 4,602,714
[45] Date of Patent: Jul. 29, 1986

[54] JACKET FOR STRIP FILMS

[75] Inventor: Jiro Ozeki, Tokyo, Japan

[73] Assignee: Slidex Corporation, Tokyo, Japan

[21] Appl. No.: 686,538

[22] Filed: Dec. 26, 1984

[30] Foreign Application Priority Data

May 2, 1984 [JP] Japan .................................. 59-87800
Aug. 21, 1984 [JP] Japan .................................. 59-172368

[51] Int. Cl.⁴ ........................ B65D 85/67; G09F 1/10
[52] U.S. Cl. ................................... 206/455; 40/158 B;
40/159
[58] Field of Search ...................... 40/158 B, 159, 537;
206/455; 353/120

[56] References Cited

U.S. PATENT DOCUMENTS

| | | | |
|---|---|---|---|
| 3,539,254 | 11/1970 | Smitzer | 353/120 |
| 3,546,053 | 12/1970 | Goldberg et al. | 206/455 |
| 3,596,393 | 8/1971 | Lithgow | 40/159 |
| 3,973,344 | 8/1976 | Frankel | 353/27 R |
| 4,319,703 | 3/1982 | Gann | 40/159 |
| 4,447,973 | 5/1984 | Wihlke | 40/159 |

FOREIGN PATENT DOCUMENTS 1155016 9/1963 Fed. Rep. of Germany ...... 206/455

Primary Examiner—William Price
Assistant Examiner—Jimmy G. Foster
Attorney, Agent, or Firm—Fleit, Jacobson, Cohn & Price

[57] ABSTRACT

Disclosed herein is a film jacket for strip film comprising a surface sheet, a back sheet and a pair of locating means each consisting of at least two welded portions as a unit which are separated from each other in the width direction of the strip film at distance slightly larger than the width of the strip film, said pair of the locating means being separated from each other in the length direction of the strip film pocket and said welded portions constituting a film pocket for holding a strip film therein. The welded portions of the paired locating means on either one of the upper and lower sides of the film pocket may be united together to form a short or long welded portion which is positioned between the welded portions on the other side of the film pocket.

13 Claims, 19 Drawing Figures

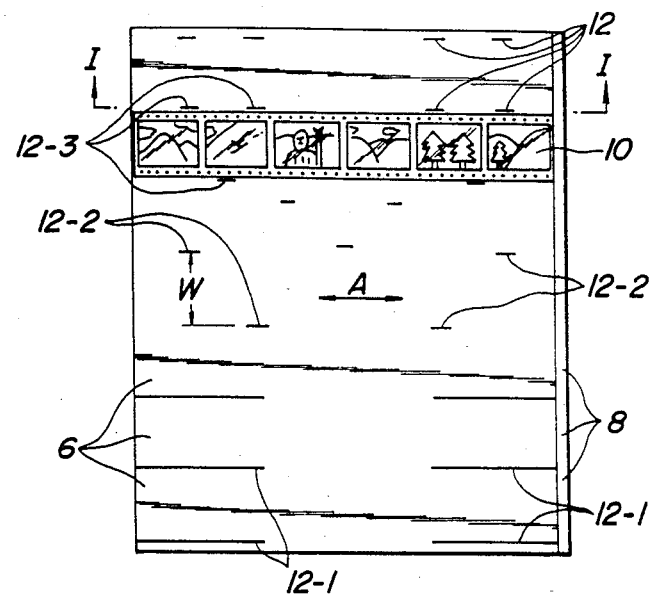
FIG_1a
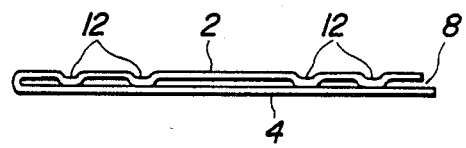
FIG_1b
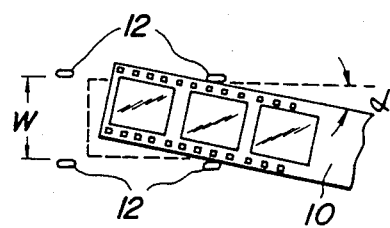
FIG_1c

FIG._3a
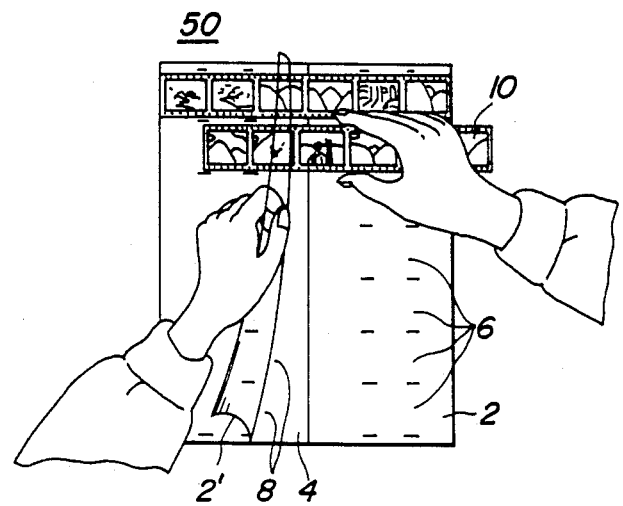
FIG._3b
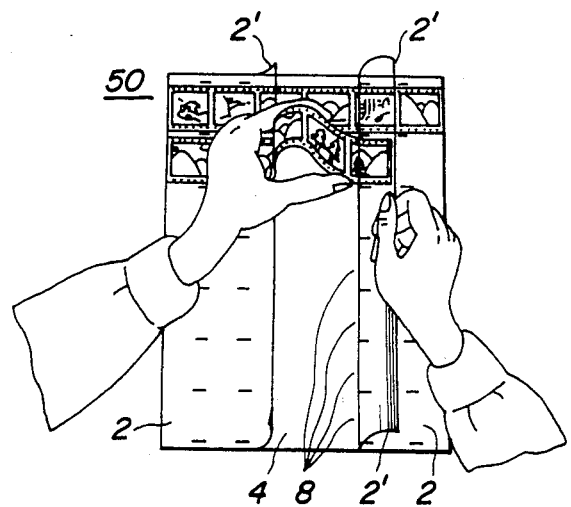

FIG._5a
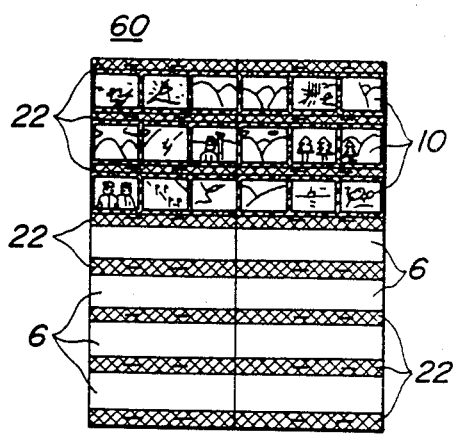
FIG._5b
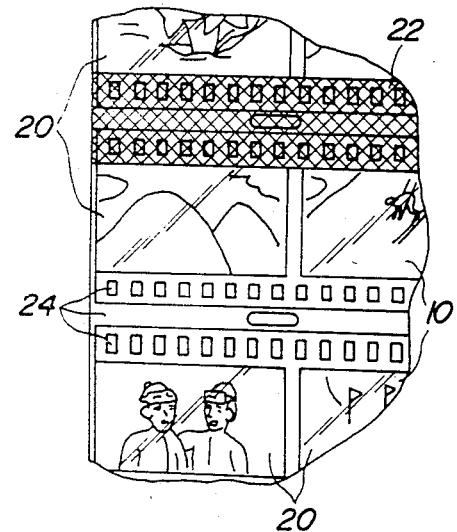
FIG._5c
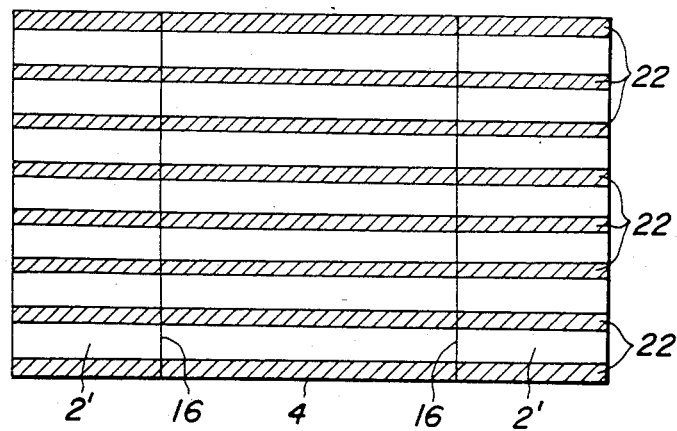

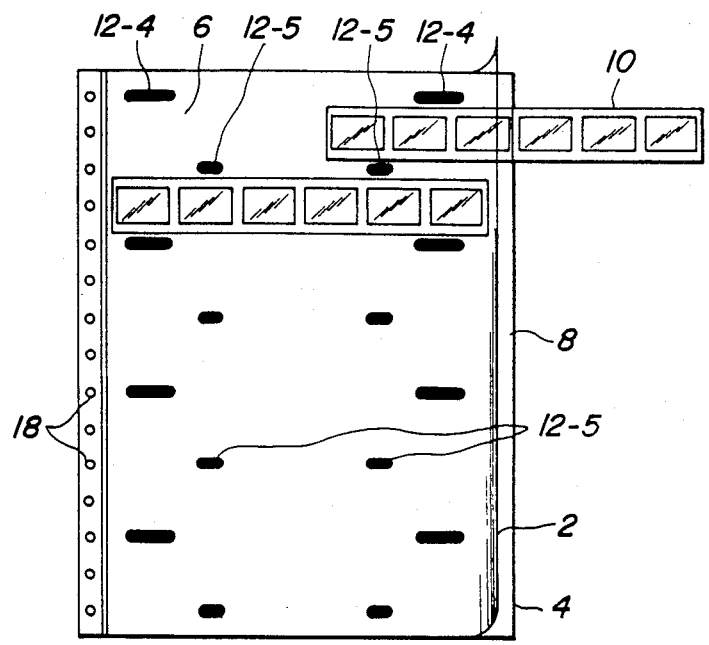
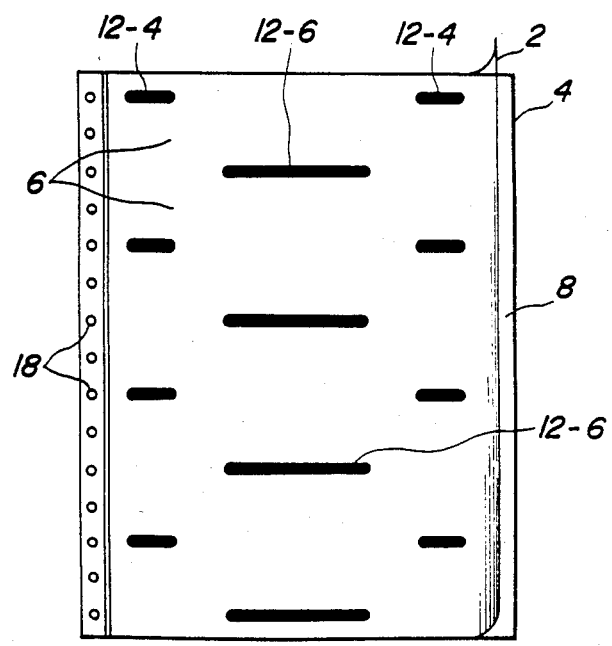

FIG_8a
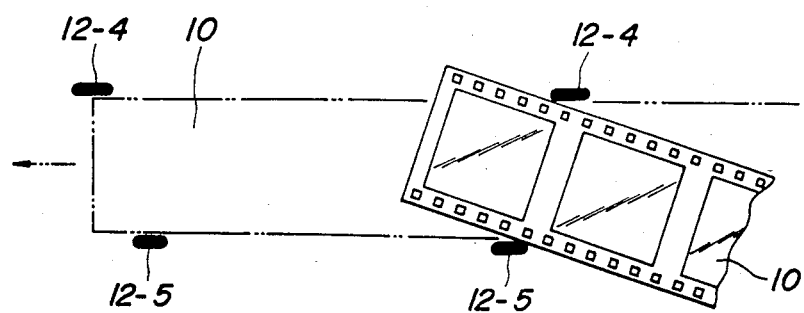
FIG.8b
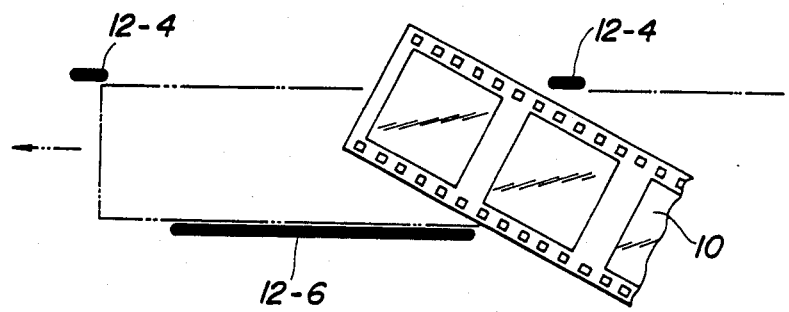

JACKET FOR STRIP FILMS

BACKGROUND OF THE INVENTION (1) Field of the Invention

The present invention relates to a film jacket to be favorably used in receipt, arrangement and storage of a long strip film such as a microfilm, a negative film, a positive film, etc., and also suitably used for the projection of images of the film by a projector of, for instance, an overhead type while the film is being received therein.

(2) Description of the Prior Art

In general, the known film jackets for holding the long strip films are broadly classified into the following two types:

As shown in FIG. 10, one of the two types of the film jackets is a so-called loose type film jacket in which a surface sheet and a base sheet are welded together in the length direction of the long strip film A to be held therein and over a distance substantially corresponding to the entire length and the width W of the film pocket C formed between the adjacent joined portions B and B is designed considerably wider than the width w of the strip film A. The other is a so-called close type film jacket in which the width of the film pocket is designed slightly larger than that of the film.

Although the loose type film jacket has the advantage that the long strip film A can be easily inserted into the film pocket C because the width W of the film pocket C is considerably wider than the film width w, such a film jacket has the defects that the film in the film pocket C can not be accurately located, so that when the film images are projected while the film jacket holding, for instance, the positive films, is placed in the overhead type projector, it is practically impossible to always accurately locate the central portion of the positive film onto the optical axis of the projector and to completely eliminate the inclination of the image, and further that the strip film A is slipped away from the film pocket when the film jacket is carried. In addition, since the known jacket has a relative larger light permeation area of a zone consisting of the surface sheet 2 and the back sheet 4 and a zone consisting of sprocket holes positioned on both edges in the film width direction for winding up the film in the surrounding of the strip film held in the jacket, when the jacket is held up to the light source, a great amount of light beams leak from the light permeation area, so that the images become extremely difficult to see.

On the other hand, since the difference in the width between the film pocket and the film is slight in the case of the close type film jacket, there do not occur the problems mentioned in connection with the loose type film jacket after the long strip film is inserted into the film pocket. However, the close type film jacket has the drawbacks that it is not easy to insert the strip film into the film pocket, and even when the film-inserting direction is slightly different from the direction in which the film pocket is extended, the corner portion of the film is caught by the welded portion of the surface and back sheets, and consequently is bent thereby. Such problems are more serious in the case of the endscope film, the microfilm and the like in which the film width is far smaller as compared with the length of the film, and in the extreme case, a special assistant instrument is necessary to insert the films of these kinds into the film pockets. This makes the film-inserting operation more troublesome.

SUMMARY OF THE INVENTON

An object of the present invention is to advantageously resolve such problems encountered by the prior art.

More specifically, the object of the present invention is to provide a film jacket which allows extremely easy insertion of a long strip film into a film pocket, and which can assuredly hold the long strip film at a predetermined location of the film pocket after insertion.

To accomplish this object, according to one aspect of the present invention, there is a provision of a film jacket for strip films in which a pair of locating means each consisting of at least two welded portions as a unit which are separated from each other at a distance slightly larger than the width of the strip film in the width direction of the strip film are provided, and a pair of the locating means are separated from each other in the length direction of the strip film so as to form a film pocket.

According to another aspect of the invention, there is a provision of a film jacket for long strip films in which a film pocket for a long strip film is formed by two short welded portions between a surface and back plastic sheets which welded portions are largely separated from each other in the length direction of the film to be held therein and adapted to be brought into contact with one side edge of the film in the width direction thereof and another short or long welded portion which is separated from the first short welded portions by a distance corresponding to the width of the film in the film width direction and postioned within the separation width of the first short welded portions, while being adapted to be brought into contact with the other side edge of the film in the film width direction.

According to the film jacket for the strip films in the first aspect of the present invention, since the film pocket is formed by a pair of the locating means separated from each other in the length direction of the strip film, strip film can be supported by their opposite side edges, so that the strip film can be assuredly held at the predetermined position. In addition, even when the direction in which the pocket is extended is slightly different from the direction in which the film is inserted into the film pocket, the corner portion of the film is not caught by the laid welded portions 12 on the way in which the film is being inserted, thereby facilitating the insertion operation of the film.

According to the film jacket of the second aspect of the present invention, since each of the welded portions at the opposite sides of the film which form the film pocket are brought into contact with the film only at a place where the corresponding opposite side welded portion does not contact with the film when the long strip film is inserted into the film pocket, in other words, since the welded portions on the opposite sides of the film are brought into contact with the corresponding side edges of the film at different places spaced from each other or one another in the length direction of the film pocket, even when the pocket-extending direction and the film-inserting direction are slightly different from each other, the insertion will not be prevented when the welded portion and the corner portion on the tip portion of the film are brought into contact with each other. Therefore, the film will not be bent during insertion. In addition, in order to completely insert the film, the film is rotated in the opposite direction to the side to which the rotational movement of the film is permitted until the film rotational movement is restricted by the welded portion so that the film insertion direction may be in coincidence with the film pocket-extending direction, whereby the film can be easily and assuredly inserted into the predetermined location. In the inserted state, since the distance by which the welded portions are separated from each other in the film width direction is a distance corresponding to the width of the film, the film is effectively prevented from moving in the width direction thereof by the abutting between the film and the welded portions, while the movement of the film in the film length direction is prevented by the frictional force among the film and the surface and back sheets.

These and other objects, features and advantages of the invention will be well appreciated upon reading of the following description of the invention when taken in conjunction with the attached drawings with understanding that some modifications, variations and changes thereof could be easily made by the skilled in the art to which the invention pertains without departing from the spirit of the invention nor the scope of the claims appended hereto.

BRIEF DESCRIPTION OF THE DRAWINGS

FIGS. 1a–1c are views of a film jacket for long strip films which schematically shows four embodiments according to the present invention;

FIGS. 3a and 3b are views schematically illustrating the use of the film jacket for the strip films as shown in FIGS. 2a and 2b;

FIGS. 5a–5c are views illustrating a film jacket for the film strip according to still other embodiment of the invention;

FIGS. 7a–7c are plane views of film jackets for strip films according to still further embodiments of the invention;

FIGS. 8a and 8b are views each illustrating the state in which a film is being inserted into the film jacket for the strip films according to the invention;

DESCRIPTION OF THE PREFERRED EMBODIMENT

Figure 2A:
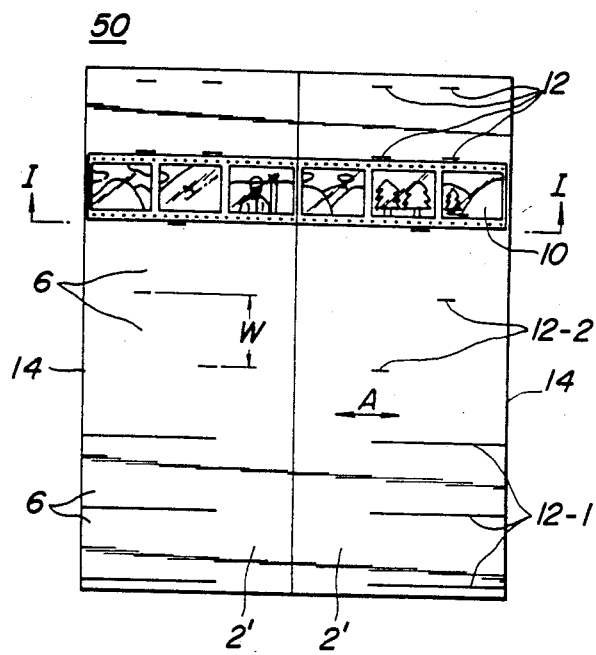
FIGS. 2a and 2b are views of a film jacket for strip films which schematically show embodiments according to the present invention.

The invention will be explained more in detail with reference to the attached drawings in which the same or similar parts are denoted by the identical reference numerals throughout the specification and the drawings attached hereto.

For the purpose of simplification, four types of film jackets for the strip films according to preferred embodiments are shown in FIG. 1a. In the four types of the film jackets, welded portions are denoted by reference numerals 12, 12-1, 12-2 and 12-3, respectively.

A surface sheet 2 and a back sheet 4 of the film jacket 40 are, for example, thermally fused or bonded together to form a pair of locating means shown at 12, . . . each consisting of at least two welded portions as a unit which are separated in the width direction of the strip film by a distance slightly larger than the width of the film.

This pair of the locating means are separated from each other in the length direction of the strip film 10 to form a film pocket 6. As clearly shown in FIG. 1a, the locating means may be a pair of four welded portions 12 arranged in the width direction of the strip film 10, a pair of two linear welded portions 12-1 separated from each other in the width direction of the strip film, a pair of the welded portions 12-2 which are separated from each other in the width direction of the strip film and deviated from each other in the length direction thereof, or a pair of the welded portions 12-3 arranged in the staggered fashion.

FIG. 1b is a sectional view of the film jacket in FIG. 1a taken along the line I—I. As obvious from FIG. 1b, there is no welded portion between the pair of the locating means separated from each other in the film pocket-extending direction A. Therefore, even when the direction in which the strip film 10 is being inserted into the pocket is slightly different from the film pocket-extending direction A, as shown in FIG. 1c, since the strip film is allowed to rotate around the locating means within the film pocket 6, the film can be easily inserted into the film pocket through the film insertion opening 8. As the strip film which has been passed through the locating means near the film insertion opening 8 is advanced inside of the film pocket 6 while being guided by this locating means, the strip film reaches the other locating means having a space W and distant from the film insertion opening 8 and then is smoothly passed through this locating means to be positioned at the predetermined location. In addition, since the space W of the welded portions forming the pocket 6 is substantially equal to the width of the film, the strip film held by a pair of the locating means does not moved up or down or get out of position within the pocket.

Further, the film jacket employing the welded portions 12-1 which are longer than the other welded portions or additional intermediate welded portions in addition to a pair of the welded portions is particularly suitable in the case where the length of the film is relatively shorter than the whole length of the pocket.

In the embodiments shown in FIG. 2a, the side edge portion 14 of the jacket which is opposed to the film insertion opening 8 is sealed to prevent the film 10 from slipping away from the pocket in the left direction as shown in FIG. 1a. But, the sealed left side edge portion may be opened as a film insertion opening so that the strip film may be inserted from the right and left sides of the pocket.

In FIG. 2a, there is shown other preferred embodiments in which the surface sheet 2 is divided into two sections 2', 2' at a line intersecting with the pocket-extending direction A, and at least one of the thus divided two sections is adapted to be opened and closed with respect to the base sheet in the pocket-extending direction to form a film insertion opening 8. For simplication purpose, four types of film jackets for the strip films are shown in FIG. 2a as in the case with FIG. 1a.

In the use of the jacket 50, as shown in FIG. 3a, for instance, the surface sheet section 2' positioned on the left side in FIG. 3a is opened in the pocket-extending direction, and the strip film 10 is pushed into the pocket from the film insertion opening 8 toward the left side of the pocket. When a part of the strip film is completely inserted into the left side of the film pocket, as shown in FIG. 3b, the surface sheet section 2' positioned on the right side is opened to the right side and the strip film 10 is pushed toward the right side of the pocket from the film insertion opening 8, thereby completing the insertion of the remaining part of the strip film into the right half portion. Thereafter, the surface sheet section 2' is closed to prevent dusts in air, etc. from being adhered to the strip film.

Figure 2B:
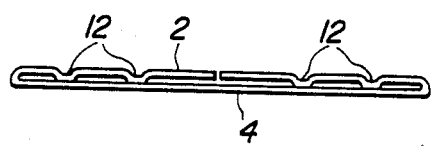

Since the embodiments shown in FIGS. 2–3 are designed to put and hold strip film 10 into the right and left pocket sections, the distance by which the strip film 10 is pushed into the pocket in one pushing operation may be short, and positional adjustment including the rotation of the strip film with respect to the pocket 6 becomes easier, thereby facilitating the film-inserting operation. In the illustrated embodiments, the jacket is formed by bonding the surface sheet and the back sheet which are substantially in the same profile, but as shown in FIG. 5c, a single plastic sheet is folded along crease lines 16, 16 to form the surface sheet sections 2' and 2', and a back sheet 4, and finally a jacket 50 is formed by welding them as mentioned above. In this case, since it is no need to join the both side edges of the jacket after welding, such is advantageous from the manufacturing and economical standpoints.

Figure 4:
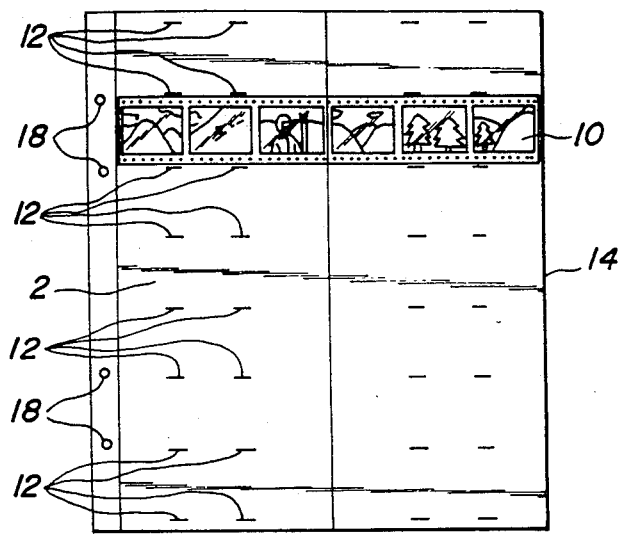
FIG. 4 is a plane view of a modification of the film jacket for the strip films shown in FIG. 3.

FIG. 4 shows an embodiment in which binding holes 18 are provided along one of the side edge portions of the jacket as shown in FIG. 2 so as to facilitate the arrangement and storage of the plural jackets. As a matter of course such binding holes can be provided in the jacket 40 as shown in FIG. 1.

FIG. 5 is a view showing a further preferred embodiment of the film jacket for the strip films according to the present invention. As clearly shown in FIG. 5b, the jacket 60 has a light-reducing zone 22 which is provided around an image area 20 of the strip film 10, so that light beams are prevented from leaking through the light permeation range 24 consisting of the surface sheet and the back sheet to enable the large contrast image to be obtained. Thus, it is preferable as shown in FIG. 5c, the light-reducing zones 22 are preliminarily formed in the plastic sheet and the sheet is folded along the crease lines 16, 16 to form the jacket. Particularly, according to the jacket for the strip films according to the present invention, the space W of the pocket is made slightly larger than the width of the strip film 10, and the strip film is held at the side edge portions. Thus, the light-reducing zone can be accurately formed in such a manner that the light-reducing zone 22 may not be overlapping with the film image portion 20, and almost no light permeating zone may be formed between the light-reducing zone and the film image zone 20.

This is particularly advantageous when the fact that the space between the sprocket holes for winding up the film and the film image area is very small is taken into account. For instance, when the light-reducing zone is so provided onto the known loose type jacket that the light-reducing zone may not be overlapped with the film image portion, since the film moves up and down in the film pocket, the film image zone is not only overlapped with the light-reducing zone but also the light is leaked through the sprocket holes on the opposition side of the overlapped portion. Consequently the image becomes hard to be seen. To the contrary, according to the jacket of the present invention, since the strip film can be held at the fixed location, such inconvenience will not take place.

Figure 6:
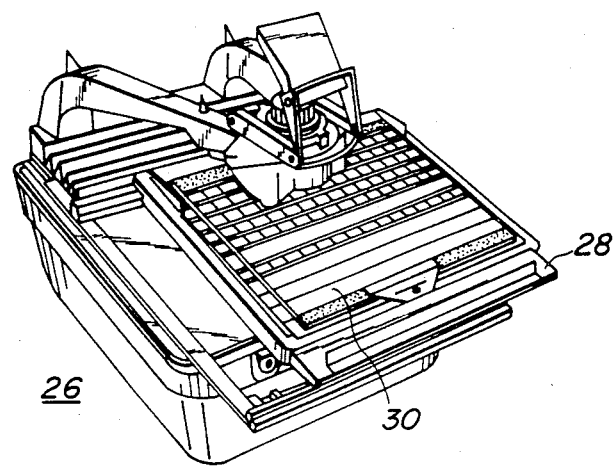
FIG. 6 is a perspective view showing the case in which the projectable film jacket for the strip films according to the present invention is mounted on a projector.

Further, when the surface sheet 2 and the back sheet 4 are made of transparent plastic sheet in the above-mentioned embodiments, the film jackets can be subjected to the direct projection by using the projector 26 as shown in FIG. 6. This is because the strip film 10 can be assuredly held. In making the projection, the jacket 60 may only be put onto a jacket holder 28 which is movable within the same plane on a frame of the projector 26, and for instance, pressed down by using a glass plate. The image projected has a large contrast and is very easy to see.

As mentioned above in detail, in the jacket for the strip films according to the present invention, the strip film can be assuredly held at the predetermined position by a pair of the locating means each consisting of at least two welding portions which are separated from each other in the width direction of the strip film by a distance slightly longer than the width of the strip film. Further, since the locating means are separated from each other in the length direction of the strip film, even when the strip film insertion direction is slightly deviated from the film pocket-extending direction, the strip film is being pushed into the first locating means, and then the insertion direction can be easily adjusted, so that the long strip film can be easily inserted by hand without using any special insertion assistant instrument. In addition, in the case of the film jacket in which the surface sheet is divided, the film insertion opening is provided at the intermediate portion of the film pocket and both the opposite ends of the film pocket are closed, the insertion operation becomes easier and there is no fear that the film is slipped away from the film pocket. Furthermore, since the film can be assuredly held in the pocket at the fixed position, the film held on the jacket can be directly projected by the projector. In addition, since the film can be held at the fixed position, the light-reducing zone may be provided with accuracy at a portion other than the film image area. Therefore, since there is no likelihood that unnecessary light is leaked from the non-image area, the image with the large contrast can be obtained even in the case where the film is inspected while the jacket is placed on a light table as it is.

The film jacket for the strip films according to the present invention is not restricted to the above-mentioned embodiments, but various modifications, variations and changes could be made within the scope of the claims appended hereto. For instance, the surface sheet may be made transparent and the back sheet is made aventurine lacquer and is provided with the light reducing zone, whereby the visual inspection operation of the strip film is made easier. The hardness of the surface sheet and the back sheet may be appropriately selected depending upon the use purpose. Furthermore, the inside welded portions 12-2, 12-2 on the lower or upper side may be shifted and united together to be located as a single short welded portion in the middle portion of the film jacket. Alternatively, the two inside welded portions 12-2, 12-2 on the lower or upper side may be continued together to form a single long middle welded portion.

In the following, such modifications according to the present invention will be explained with reference to FIGS. 7-9.

Figure 7A:
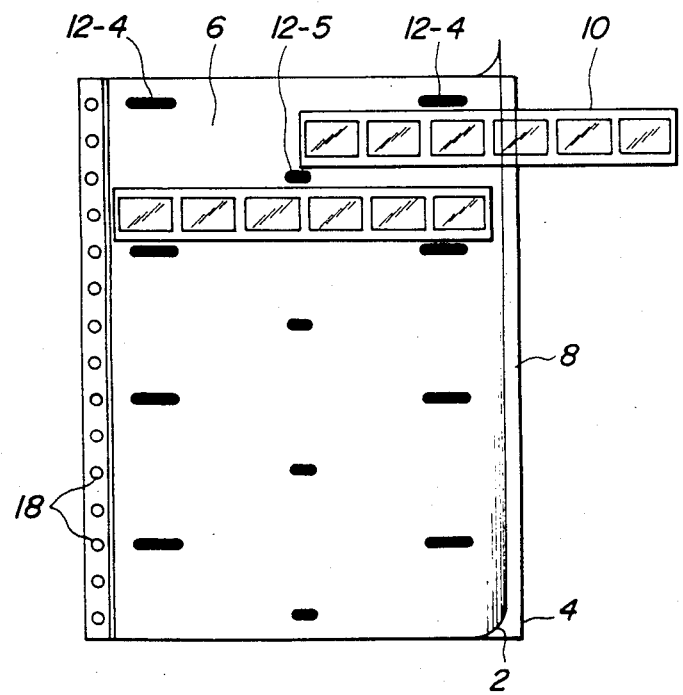

FIGS. 7a-7c show plane views of still further embodiments according to the present invention. The surface sheet 2 and the back sheet 4 may be formed, for intance, by folding a transparent plastic sheet at the substantially central portion thereof. As a matter of course, the surface sheet 2 and the back sheet 4 may be formed by two completely separate sheets.

The surface sheet 2 and the back sheet 4 are bonded together through bonding or thermal fusion over a short distance at two locations spaced to a large extent in the length direction of the long strip film 10 to be held there. The thus formed short welded portions 12-4, 12-4 are designed to be brought into contact with one side edge portion of the strip film 10 in the width direction thereof. On the other hand, for instance, a short welded portion 12-5 of the surface and back sheets is provided separating from the short welded portions 12-4, 12-4 by a distance corresponding to the width of the film and positioned within the width of the short welded portions 12-4, 12-4. Thereby, the film pocket 6 for the long strip film is formed by the short welded portions 12-4 and 12-5. Since the space between the welded portions 12-4 and 12-5 corresponds to the width of the film 10, the film 10 inserted into the pocket 6 is restricted from moving in the width direction thereof by the short weld portion 12-5 being brought into contact with the other side edge portion of the film 10.

In FIG. 7a is shown the embodiment in which one short welded portion 12-5 is provided in the middle portion within the width between both the welded portions 12-4, 12-4, and FIG. 7b shows an embodiment in which two short welded portions 12-5 and 12-5 are provided on the opposite end portions of the width between the welded portions 12-4 and 12-4, and FIG. 7c shows an embodiment in which the two welded portions 12-5 and 12-5 shown in FIG. 7b are continued with each other to form a long welded portion 12-6. These welded portions 12-5 and 12-6 all act to assuredly restrain the movement of the film 10 in the width direction in cooperation with the welded portion 5.

In the figure, a reference numeral 18 is a binding hole formed in the folded side portion of a plastic sheet, and a reference numeral 8 shows a film insertion opening formed on a free end portion between the surface sheet 2 and the back sheet 4.

The film insertion opening 8 can be easily opened by shifting the edge portion of either one of the surface sheet 2 and the back sheet 4 toward the binding hole 18.

According to the thus constituted film jacket, when the long strip jacket is intended to be inserted into the film pocket 6 from the film insertion opening 8, since the welded portions 12-4 and 12-5 or the welded portion 12-4 and 12-6 are separated from each other in the length direction of the film pocket 6 and are adapted to be brought into contact with the film side edges on the opposite sides respectively, the insertion resistance of the film 10 is small and the insertion is easy. Further, as shown in FIG. 8, even when the insertion direction of the film 10 and the film pocket-extending direction are slightly different from each other, the corner portion on the tip portion of the film 10 is not caught by the welded portions. Thus, there is no likelihood that the film 10 is bent or cannot be inserted. In order that the film 10 may be completely inserted, when the film insertion direction and the pocket extending direction are in coincidence with each other, the film 10 is pushed into the terminal end of the pocket while its posture is being maintained, or when the film insertion direction is inclined with respect to the pocket-extending direction, the film 10 is rotated in the opposite direction to the inclined side until the rotational movement is restricted by the welded portion 12-5 or 12-6, and the film is pushed into the pocket terminal end while the film posture is being maintained. Thereby, the long strip film 10 is completely held at the fixed position.

The film 10 thus inserted into the pocket 6 is assuredly restrained from moving in the width direction thereof under the cooperation of the welded portions 12-4 and 12-5 or the welded portions 12-4 and 12-6 which are spaced from each other by a distance substantially equal to the width of the film, whereas the movement of the film 10 in the length direction is fully prevented by the frictional force imparted upon the film 10 by the welded portions 12-4 and 12-5 or the welded portions 12-4 and 12-6 and the surface sheet 2 and the back sheet 4. Thus, the strip film 10 is located at the predetermined position of the film pocket. Accordingly, the long strip film 10 will not be slipped away from the film pocket 6 when the film jacket is carried, and the film strip can always assuredly give an erecting image at a fixed position in a screen in the case of the projection of the image of the film in the film pocket.

Figure 9:
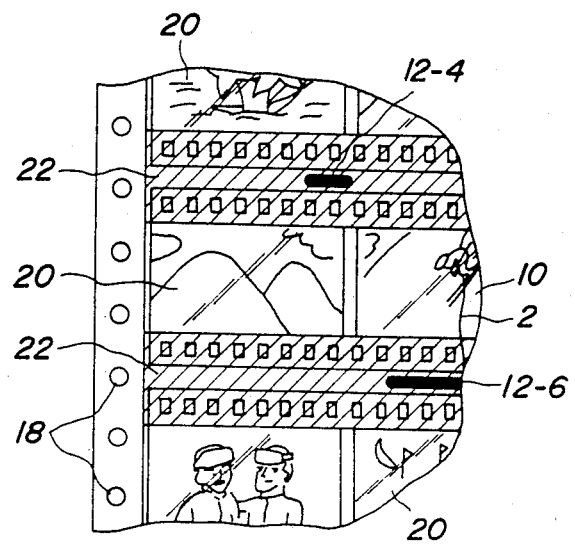
FIG. 9 is a partially enlarged view illustrating a film jacket for strip films according to still further embodiment of the invention.
Figure 10:
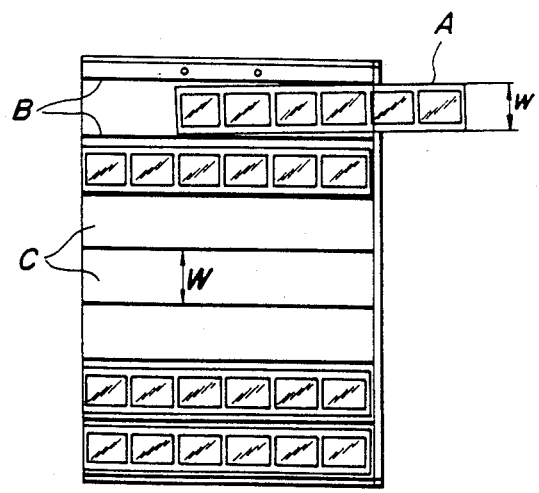
FIG. 10 is a plane view of a film jacket for strip films fallen in the prior art.

FIG. 9 is a partially enlarged plane view of still another embodiment according to the present invention, in which a light-intercepting or light-reducing zones 22 covering the joining portions 12-4, 12-5 and 12-6 as shown by shadowed portions in the figure and extending in the length direction of the film 10 are provided at at least one of the surface sheet 2 and the back sheet 4 at an area other than a part of the pocket corresponding to the image area 20 of the long strip film to be held therein.

In the illustrated embodiment, since the bored range (sprockets) of the long strip film 10 which is assuredly located in the pocket 6 is completely covered by the light-reducing zone 22, even when the image of the film 10 held in the film jacket is held up to the light and inspected through eye, there is no likelihood that the light passing through the bored range 24 of the film 10 intercepts the projection of the film image, and that the light passing through the bored range extraordinarily increases the brightness on the screen to damage the observation of the image.

Although the present invention has been explained with reference to the embodiments shown in the drawings, in the case that the arrangement and storage of the long strip films are mainly intended, the back sheet is made of an opaque material, which facilitates the advanced inspection of the film image by the light passing through and diffused by the back sheet. Further, it may be that each welded portion 12-4 may be divided into two or more dot-like welded portions or additional dot-like or short welded portion is separately provided outside of the welded portion 12-4.

According to the present invention as described in the foregoing, the welded portions which are adapted to contact with the side edges of the film on the opposite sides in the width direction thereof are separated from each other by a distance corresponding to the width of the film, so that the film inserted into the pocket can be assuredly maintained at the predetermined position by the frictional force between the film and the welded portions and the surface sheet and the back sheet. Further, by the construction that the welded portions to be brought into contact with one of the side edges of the film in the width direction thereof are largely spaced from each other in the length direction of the film, the short or long welded portion or portions adapted to be brought into contact with the other side edge portion of the film is or are positioned within the width of the former short welded portions, and the welded portions on the opposite sides of the film are brought into contact with the corresponding opposite side edge of the film respectively at locations spaced from each other in the length direction of the film, even when the film insertion direction and the pocket-extending direction are slightly different from each other, the insertion of the film is fully assured, so that the film insertion operation can be made extremely simply and effectively performed.

What is claimed is:

1. A film jacket for holding a film strip, said film jacket comprising:
    a surface sheet,
    a back sheet,
    two locating means for guiding said film strip into said film jacket and for holding said film strip in said film jacket, each of said two locating means being defined by said surface sheet bonded to said back sheet and said two locating means being separated from each other in the width direction of the film strip at a distance slightly larger than the width of the film strip to form a close-type film pocket for assuredly holding said film strip between said surface sheet and said back sheet,
    said two locating means being spaced from a peripheral edge of said film jacket,
    a first of said two locating means being located on a first imaginary line and a second of said two locating means being located on a second imaginary line, said first imaginary line and said second imaginary line extending substantially parallel and being spaced from each other,
    a portion of said first locating means located furthest from said peripheral edge being spaced from said peripheral edge by a predetermined distance, and
    a portion of said second locating means located closest to said peripheral edge being spaced from said peripheral edge by a distance greater than said predetermined distance.

2. A film jacket for strip film according to claim 1, wherein each locating means further comprises two pair of vertically opposed welded portions.

3. A film jacket for strip film according to claim 1 wherein each locating means further compress a pair comprises of opposed linear parallel welded portions.

4. A film jacket for strip film according to claim 1, wherein each locating means further comprises a pair of two welded portions deviated in the length direction of the film pocket.

5. A film jacket for strip film according to claim 4, wherein the two welded portions on either one of upper and lower sides of the film pocket is positioned within a width of the welded portions on the other side.

6. A film jacket for strip film according to claim 4, wherein the two welded portions positioned within the width of the welded portions on the other side of the film pocket are continued to form a long welded portion.

7. A film jacket for strip film according to claim 4, wherein the two welded portions positioned within the width of the welded portions on the other side of the film pocket is united together as a short welded portion which is located in the middle portion between the welded portions on the other side.

8. A film jacket for strip film according to claim 1, wherein each locating means further comprises three welded portions staggered in the length direction of the film pocket.

9. A film jacket for strip film according to claim 1, wherein the surface sheet is divided into two surface sheet sections at a line intersecting with the pocket-extending direction.

10. A film jacket for strip film according to claim 1, wherein binding holes are provided in one of the side portions of the film jacket.

11. A film jacket for strip film according to claim 1, wherein a light-intercepting or light-reducing zones are provided to cover an area other than an image area of the strip film on the longitudinal sides thereof held in the film pocket.

12. A film jacket for strip film according to claim 1, wherein the surface sheet and back sheet are formed from a single sheet.

13. A film jacket as claimed in claim 1, wherein a top edge and a bottom edge of said film strip are abutted by said locating means when said film strip is located in said film pocket.

* * * * *